July 8, 1947.                    J. PRATA                    2,423,726
                    QUICK BREAKING UNION FOR PIPE ENDS
                         Filed June 7, 1945
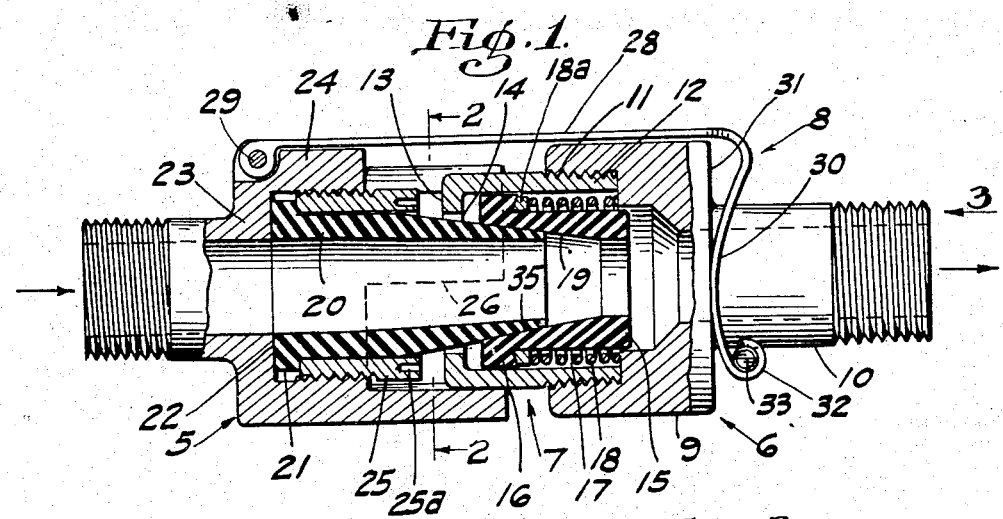
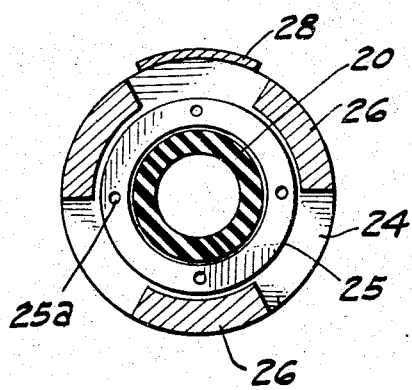 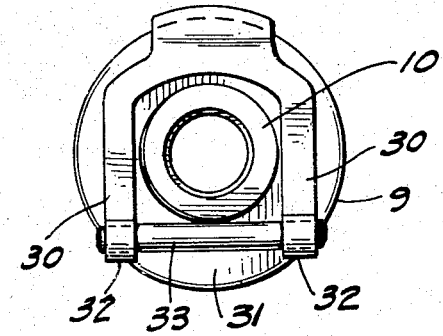
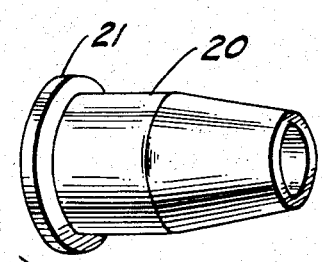 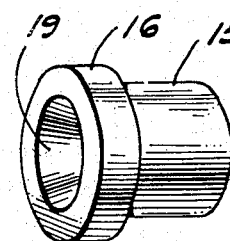 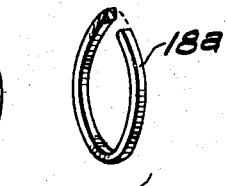
Joe Prata,
INVENTOR Patented July 8, 1947

2,423,726

UNITED STATES PATENT OFFICE 2,423,726

QUICK BREAKING UNION FOR PIPE ENDS

Joe Prata, Torrance, Calif.

Application June 7, 1945, Serial No. 598,102

3 Claims. (Cl. 285—170)

This invention relates to a quick breaking union for pipe ends.

An object of the invention is to provide an improved arrangement of interengaging tubular elastic sealing elements positioned between the pipe ends, in combination with means for drawing the pipe ends toward each other in such a manner as to efficiently apply a compressive pressure to said sealing elements to augment their sealing function.

Another object is to provide, in combination with two pipe end members to be coupled together, a more quickly operable means both for separating two connected pipe end sections and for reuniting them in an efficient fluid tight manner.

Yet another object is to provide an improved swingable, resilient yoke pivoted to one of the pipe end members and having springy arms to straddle the other pipe end member and abut against a portion thereof in such a manner as to force the pipe end members toward each other in an efficient manner.

A more specific object is to provide, in a pipe end sealing assembly utilizable for gas, water, steam and air, cooperating internal and external spring means to urge together more efficiently the sealing surfaces of the sealing means proper.

Other objects, features and advantages of invention will hereinafter appear.

Referring to the accompanying drawing which illustrates what is at present deemed to be a preferred embodiment of the invention, Fig. 1 is a view of the complete device showing it partly in side elevation and partly in vertical midsection.

Fig. 2 is a cross section on line 2—2 of Fig. 1.

Fig. 3 is an elevation looking at the right hand end of the device as shown in Fig. 1.

Fig. 4 is an exploded, perspective view of the sealing members, a thrust washer being included in the view.

Referring in detail to the drawing, the union as a whole comprises pipe end members 5 and 6, intervening between which is the sealing assembly 7, said pipe members being drawn against the end portions of said sealing assembly by a clamping means 8.

The pipe end member 6 has a terminal head 9 formed by enlarging the diameter of the pipe section 10 and thickening a portion of its wall at its end, said thickened wall portion terminating in a peripheral, internally screwthreaded flange 11. A cup-shaped member 12 has a bottom 13 provided with a circular, axial opening 14. The end of this member opposite to its bottom is externally screw-threaded for screwing into the aforesaid pipe end flange 11.

An open-ended elastic, tubular female sealing member 15 has one end slidably fitted within the thickened wall portion of the head 9, and has an exterior flange 16 around its opposite end which fits with an adjustive fit inside of the cup-shaped member 12, thereby forming a closed-in annular space 17 within the latter member, a spiral compression spring 18 housed in said space acting against the flange 16 to hold said flange against the cup bottom 13 when the parts are in an unsealed condition. A thrust washer 18a is interposed between the flange 16 and spring 18. The flanged end portion of said female member 15 is tapered inwardly at 19 in a frusto-conical manner.

An open-ended, elastic, tubular male sealing member 20 which is shown extending adjustably through the bottom opening 14 of the cup, has an externally tapered end portion which is wedgeable in a fluid tight manner into the aforesaid frusto-conically tapered portion of the female member. Said male member has at the end thereof opposite to its taper an external peripheral flange 21, this flanged part abutting against an annular shoulder 22 resulting from enlarging the internal diameter of the head 23 of the pipe section 5. Outwardly around said shoulder 22 the head 23 has a peripheral flange 24 which is internally screwthreaded to have screwed into it a clamping collar 25 to urge the flange part 21 against the aforesaid annular shoulder 22. Said collar 25 is shown having diametrically opposite recesses 25a to receive a suitable tool for screwing it down. Said flange 24 carries a plurality of circumferentially spaced apart guide fingers 26, three of these fingers being shown, made integral with the flange. Said fingers are arcuated in cross section to fit with working fits around the exterior of the cup-shaped member 12.

By preference and as indicated in the drawings, the female member 15 and male member 20 are both constructed of rubber, elastic material being desirable to form a more efficient fluid tight seal. The internal diameters of the pipe section 5 and the male member 20 are shown as being equal thus providing a smooth passage for liquid flow.

Describing in further detail the clamping means 8, this means consists of a resilient strap metal arm 28 having at one end a pivoted connection 29 with an outer side portion of the head 23, the opposite end portion of said arm being deflected in a generally rightangular direction and shaped as a yoke having a pair of arms 30 bowed toward the attached end of the yoke which straddle the pipe section 10 and will press forcibly against the shoulder 31 formed by the outer side of the head 9. Each arm is shown curled toward the shoulder 31 and provided at its extremity with a curl 32 for receiving a locking pin 33.

In Fig. 1 the device is shown with the two pipe end members held by the resilient clamping means 8 forcibly against opposite end portions of the sealing assembly 7, so that the male member 20 is in an efficient fluid-sealing relation to the interior frusto-conical surface of the female member 15, the compression spring 18 offering a considerable resistance to the coupling-together movement to insure firm pressure between the contacting surfaces of the male and female members.

It will be seen that the resilient clamping means 8 cooperates with the spiral compression spring 18 to augment the compressive force between the sealing surfaces, as indicated at 35 in Fig. 1, said spiral spring permitting sufficient longitudinal movement of the flange 16 to compensate for the compressive movement resulting from putting the clamp into the position shown in Fig. 1.

The use of the locking pin 33 to keep the yoke in the applied position is not vital to the successful operation of the device because the frictional manner in which the bowed resilient yoke arms engage the shoulder 31 will ordinarily safely keep the yoke in its clamped down position. However, the use of the locking pin is recommended where serious results might follow in accidental disconnection of the pipe end members, as for example in a gas supply conduit.

It should be understood that the present disclosure is for the purpose of illustration only and that this invention includes all modifications and equivalents which fall within the scope of the subject matter claimed.

I claim:

1. In a quick breaking union for pipe ends, a pipe end member having a terminal head formed by enlarging the diameter of the pipe and thickening a portion of its wall, said thickened wall portion terminating at its outer end in a peripheral internally screwthreaded flange, a cup-shaped member having a bottom with a circular axial opening therethrough, the end portion of said member opposite to its bottom being screwed into the threaded portion of said flange, an open-ended tubular female sealing member having one end slidably fitted within the thickened wall portion of the aforesaid head and having an exterior flange around its opposite end which fits with an adjustive fit within said cup-shaped member, thereby forming a closed-in annular space within the latter member, a spiral spring in said space acting against the last mentioned flange, said female member having an outwardly increasing frusto-conical space within its flanged end portion, an open-ended tubular male sealing member which extends through the aforesaid bottom opening of said cup and has an exteriorly tapered end portion swedged in a fluid-tight manner into said frusto-conical portion of the female member, said male member having an external flange around its opposite end, a second pipe end member having a head formed by thickening one of its end portions and an annular shoulder within said head against which the flanged end portion of said male member abuts, a compression collar screwed into said head of said male member and clamping said flanged portion of said male member against the latter shoulder, clamping means operatively related to said pipe end heads to draw them toward each other under compression, and a plurality of circumferentially spaced apart guide fingers carried by the second mentioned pipe end head and externally overlying the bottom portion of said cup-shaped member.

2. In a quick breaking union for pipe ends, a pipe end member having a terminal head formed by enlarging the diameter of the pipe and thickening a portion of its wall, said thickened wall portion terminating at its outer end in a peripheral internally screwthreaded flange, a cup-shaped member having a bottom with a circular axial opening therethrough, the end portion of said member opposite to its bottom being screwed into the threaded portion of said flange, an open-ended elastic tubular female sealing member having one end slidably fitted within the thickened wall portion of the aforesaid head and having an exterior flange around its opposite end which fits with an adjustive fit within said cup-shaped member, thereby forming a closed-in annular space within the latter member, a spiral spring in said space acting against the last mentioned flange, said female member having an outwardly increasing frusto-conical space within its flanged end portion, an open-ended elastic tubular male sealing member which extends adjustably through the aforesaid bottom opening of said cup and has an exteriorly tapered end portion swedged in a fluid-tight manner into said frusto-conical portion of the female member, a second pipe end member, the latter pipe end member being in an abutting sealed relation to that end of said male member which is opposite to its taper, and clamping means operatively connected to said pipe end heads to draw them toward each other under compression.

3. In a pipe connection, two pipe end members at least one of which terminates in a diametrical enlargement, elastic sealing means between said members which is rendered more efficient by compression, and a single swingable yoke attached to one of said members and having resilient arms to engage opposite side portions of the other of said members thereby to press against the aforesaid diametrical enlargement and force said members toward each other placing said sealing means under compression, and a pin insertable through the extremities of the resilient arms of said yoke to keep the yoke in place when it is in the applied position.

JOE PRATA.

REFERENCES CITED

The following references are of record in the file of this patent:

UNITED STATES PATENTS

| Number | Name | Date |
| --- | --- | --- |
| 1,288,256 | Steiger | Dec. 17, 1918 |
| 1,926,949 | Kennedy | Sept. 12, 1933 |